United States Patent
Hahm et al.

(10) Patent No.: US 7,242,757 B2
(45) Date of Patent: *Jul. 10, 2007

(54) METHOD FOR PROVIDING A SUBSCRIBER-BASED RINGBACK TONE SOUND

(75) Inventors: Hee Hyeok Hahm, Seoul (KR); Ki Mun Kim, Incheon-si (KR); Sang Yun Lee, Seongnam (KR); Yeong Tae No, Seoul (KR); Jae Young Park, Sungnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/530,021

(22) PCT Filed: Aug. 22, 2003

(86) PCT No.: PCT/KR03/01704

§ 371 (c)(1),
(2), (4) Date: Aug. 17, 2005

(87) PCT Pub. No.: WO2004/032547

PCT Pub. Date: Apr. 15, 2004

(65) Prior Publication Data

US 2006/0098801 A1 May 11, 2006

(30) Foreign Application Priority Data

Oct. 1, 2002 (KR) .................. 10-2002-0059950
Oct. 1, 2002 (KR) .................. 10-2002-0059952

(51) Int. Cl.
*H04M 3/42* (2006.01)
*H04M 1/00* (2006.01)
(52) U.S. Cl. .................. 379/207.16; 379/374.01

(58) Field of Classification Search ......... 379/207.16, 379/372, 374.01, 386, 418; 455/414.2, 414.3
See application file for complete search history.

(56) References Cited

U.S. PATENT DOCUMENTS 5,926,537 A    7/1999  Birze
6,574,335 B1 * 6/2003  Kalmanek et al. .......... 379/386
7,006,622 B2 * 2/2006  Laine ...................... 379/374.01

FOREIGN PATENT DOCUMENTS

JP          2000-050347          2/2000

(Continued)

OTHER PUBLICATIONS

International Search Report of PCT/KR03/01704.

*Primary Examiner*—Bing Q. Bui
(74) *Attorney, Agent, or Firm*—Lowe Hauptman & Berner LLP

(57) ABSTRACT

The present invention relates to a method for providing an arbitrary sound chosen by a called subscriber for a caller instead of a conventional RBT (RingBack Tone). The present method comprises: the first step, conducted by an HLR (Home Location Register), of furnishing a call-originating exchanger with information on whether to replace RBT or not for a terminal if a location request message is received from the call-originating exchanger when a call connection is requested to the terminal; the second step, conducted by the call-originating exchanger, of requesting a trunk connection to a call-terminating exchanger, and further requesting another trunk connection to a sound providing means based on the information and preset routing information while furnishing the sound providing means with information to identify the terminal; and the third step, conducted by the sound providing means, of selecting a sound based on the terminal identifying information, and providing the selected sound for a caller instead of an RBT.

10 Claims, 11 Drawing Sheets

FOREIGN PATENT DOCUMENTS

| | | |
|---|---|---|
| JP | 2001-106685 | 4/2001 |
| KR | 1020000000244 | 1/2000 |
| KR | 1020000030035 | 6/2000 |
| KR | 1020000055316 | 9/2000 |
| KR | 2001-0108937 | 12/2001 |
| KR | 1020020039501 | 5/2002 |
| WO | 00/42763 | 7/2000 |

* cited by examiner

FIG. 7

| Subscriber's Number | Sound Code |
|---|---|
| ⋮ | ⋮ |
| 293-XXXX | 07 |
| ⋮ | ⋮ |
| 294-0000 | 17 |
| ⋮ | ⋮ |

*changed* → 07

FIG. 8

| Sound Code | Sound |
|---|---|
| 01 | Sound#1 |
| ⋮ | ⋮ |
| 07 | Sound#7 |
| ⋮ | ⋮ |
| 17 | Sound#17 |
| ⋮ | ⋮ |

FIG. 9

| Parameter=CallingFeaturesIndicator2 | | | | Length=V | | | | Tag=H'9fff7d | |
|---|---|---|---|---|---|---|---|---|---|
| Contents | | | | | | | | | meaning |
| H | G | F | E | D | C | B | A | Octet | Notes |
| VMSB | | VMSU | | MC | | CC | | 1 | |
| FMSNA | | FMSB | | FMSU | | VMSNA | | 2 | a |
| SRBT | | NCW | | Prefer_Sys | | MUDN | | 3 | |
| ········· | | | | | | | | n | |

*defined 'reserve' field before*

FIG. 10

| Subscriber's Head Number | Routing Address | |
|---|---|---|
| ⋮ | ⋮ | |
| 293 | IP #n | — 50 |
| ⋮ | ⋮ | |
| nnn | IP #(n+k) | |
| ⋮ | ⋮ | |

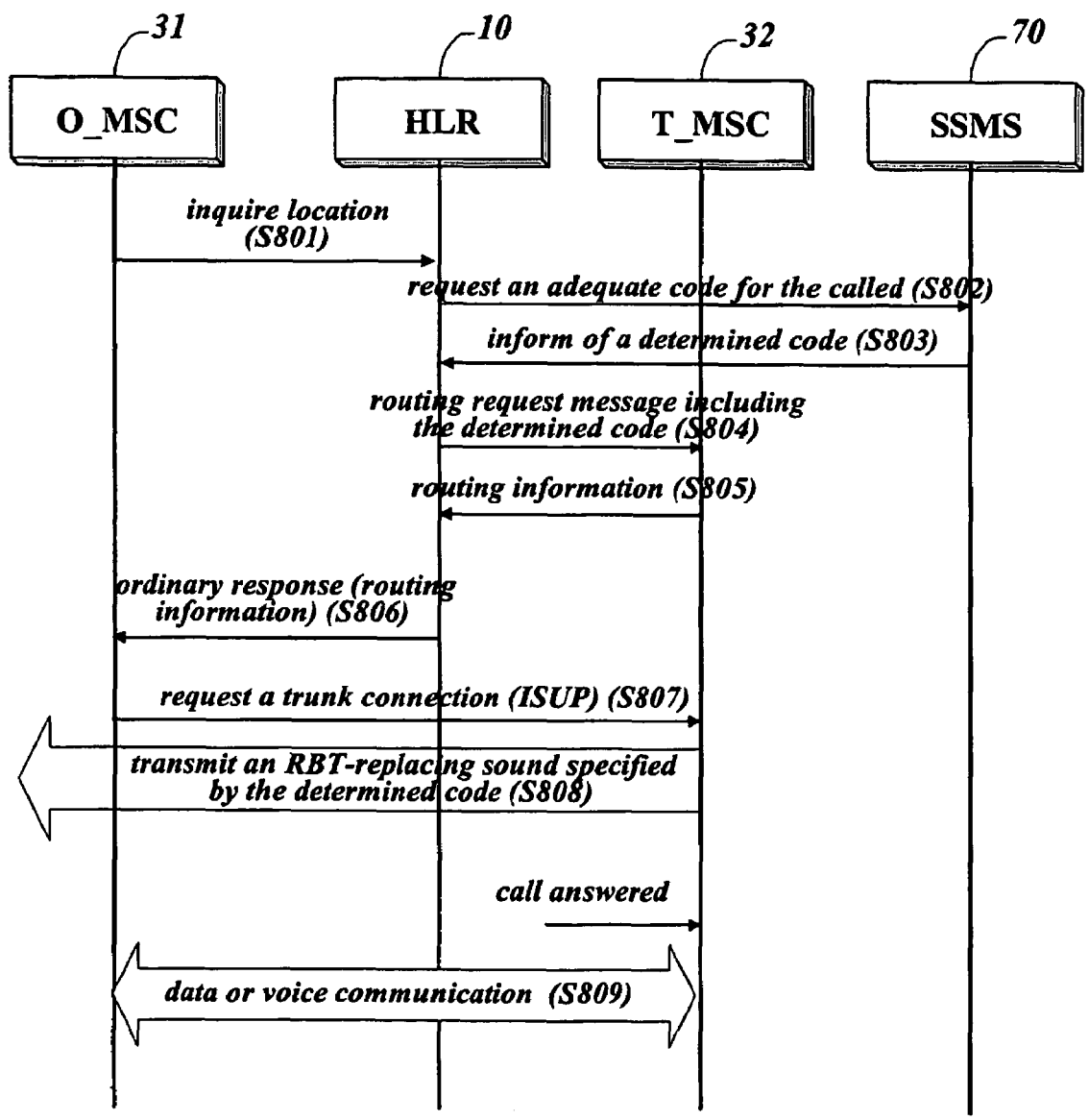

METHOD FOR PROVIDING A SUBSCRIBER-BASED RINGBACK TONE SOUND

CROSS REFERENCE TO RELATED APPLICATION

This application is the National Phase application of International Application No. PCT/KR2003/001704, filed Aug. 22, 2003, which designates the United States and was published in English. This application, in its entirety, is incorporated herein by reference.

1. Technical Field

The present invention relates to a method for providing an arbitrary sound chosen by a called subscriber for a calling subscriber instead of a conventional RBT (RingBack Tone).

2. Background Art

When a subscriber calls another through a mobile communication network, a terminating exchanger on the network provides the caller with a uniform ringback tone.

Since the ringback tone is same all the time, a caller can not identify a called before the called answers. Furthermore, the uniform ringback tone can not satisfy various subscribers' needs to reveal their personality.

By the way, various ad methods are being proposed in these days. One of these ad methods is to send an ad sound message to a caller instead of a conventional ringback tone. However, such an ad sound message is chosen unilaterally by a network operating enterprise. If a caller heard such a unilateral ad sound he or she could talk over a mobile telephone with a called for a limited time.

However, the method that an ad sound is provided instead of a conventional ringback tone still has the aforementioned drawbacks. That is, a caller can not identify a called before the called answers and the uniform ringback tone can not satisfy various subscribers' needs to reveal their personality.

3. DISCLOSURE OF INVENTION

It is an object of the present invention to provide a method for furnishing a caller an arbitrary sound chosen or registered by a called subscriber instead of a conventional RBT (RingBack Tone). In the present method, an arbitrary RBT-replacing sound chosen or registered by a subscriber is stored in a server separated from mobile exchangers first, and if a certain subscriber is called, an RBT-replacing sound that is assigned to the called in the server is provided through an exchanger for a caller instead of a conventional RBT.

It is another object of the present invention to provide an RBT replacing method in which an arbitrary RBT-replacing sound chosen or registered by a subscriber is stored in an exchanger, and if a certain subscriber is called, an RBT-replacing sound that is assigned to the called in the exchanger is directly provided for a caller.

A method of providing an arbitrary sound as an RBT in a communication network in accordance with the present invention is characterized in that it comprises: a first step, conducted by an HLR (Home Location Register), of furnishing a call-originating exchanger with information on whether or not an RBT is to be replaced for a terminal through a response to a location request message received from the call-originating exchanger that sends the location request message to the HLR when a call connection is requested to the terminal; a second step, conducted by the call-originating exchanger, of requesting a trunk connection to a call-terminating exchanger based on the response, and further requesting another trunk connection to a sound providing means based on the information with reference to preset routing information to the sound providing means while furnishing the sound providing means with information to identify the terminal; and a third step, conducted by the sound providing means, of selecting an RBT-replacing sound based on the terminal identifying information, and providing the selected RBT-replacing sound for a caller through the call-originating exchanger the trunk connection is made to.

Another method of providing an arbitrary sound as an RBT in a communication network in accordance with the present invention is characterized in that it comprises: a first step, conducted by an HLR, of furnishing an exchanger with information on whether or not an RBT is to be replaced for a terminal when location of the terminal is registered through the exchanger; a second step, conducted by the exchanger when a call to the terminal is recognized, of requesting a trunk connection to a sound providing means based on the information with reference to preset routing information to the sound providing means while furnishing the sound providing means with information to identify the terminal; and a third step, conducted by the sound providing means, of selecting an RBT-replacing sound based on the terminal identifying information, and providing the selected RBT-replacing sound for a caller through the exchanger the trunk connection is made to.

In the above methods, it is further characterized in that the routing information preset in an exchanger allocates respective head numbers of subscribers to routing addresses of a plurality of sound providing means.

Another method of providing an arbitrary sound as an RBT in a communication network in accordance with the present invention is characterized in that it comprises: a first step, conducted by an HLR, of searching for a sound code assigned to a terminal, if a location request message is received from a call-originating exchanger when a call connection is requested to the terminal, and sending the call-originating exchanger the found sound code through a response message to the location request message; and a second step, conducted by the call-originating exchanger, of requesting a trunk connection to a call-terminating exchanger based on the response message, and providing a caller with an RBT-replacing sound associated with the found sound code.

Another method of providing an arbitrary sound as an RBT in a communication network in accordance with the present invention is characterized in that it comprises: a first step, conducted by an HLR, of searching for a sound code assigned to a terminal, if a location request message is received from a call-originating exchanger when a call connection is requested to the terminal, and sending a routing information request message including the found sound code to a call-terminating exchanger; a second step, conducted by the HLR, of sending the call-originating exchanger routing information received, in response to the routing information request message, from the call-terminating exchanger; and a third step, conducted by the call-terminating exchanger, of transmitting an RBT-replacing sound associated with the found code to a caller through a trunk connection when the call-originating exchanger makes the trunk connection to the call-terminating exchanger based on the routing information.

In the latter two methods, it is further characterized in that a mobile exchanger has all of RBT-replacing sounds in its db for subscribers.

The above-characterized method provides a personal ad way by allowing a registered personal introducing or identifying sound to be used instead of a uniform RBT. In addition, a caller is able to know by only hearing an RBT-replacing sound whether he or she called rightly. An enterprise as well as individual persons can advertise efficiently through registering an RBT-replacing sound.

4. BRIEF DESCRIPTION OF DRAWINGS

In the drawings:

FIG. 1 is a simplified diagram of an embodiment of a mobile communication network which a subscriber-based RBT-replacing sound providing method is embedded in;

FIG. 7 illustrates an RBT service table structured in a sound storager managing server in accordance with the present invention;

FIG. 8 illustrates a sound list structured in a sound storager that links each RBT-replacing sound to its sound code in accordance with the present invention;

FIG. 9 shows format of the value-added service parameters including an RBT-replacing service field that are delivered from an HLR to an exchanger;

FIG. 10 illustrates a routing information table structured in an exchanger in accordance with the present invention;

FIG. 11 is a simplified diagram of another embodiment of mobile communication network which a subscriber-based RBT-replacing sound providing method is embedded in;

FIG. 13 is a procedure chart of another embodiment to conduct a subscriber-based RBT-replacing sound providing method through the mobile network of FIG. 11 in accordance with the present invention.

5. MODES FOR CARRYING OUT THE INVENTION

In order that the invention may be fully understood, preferred embodiments thereof will now be described with reference to the accompanying drawings.

Figure 1:
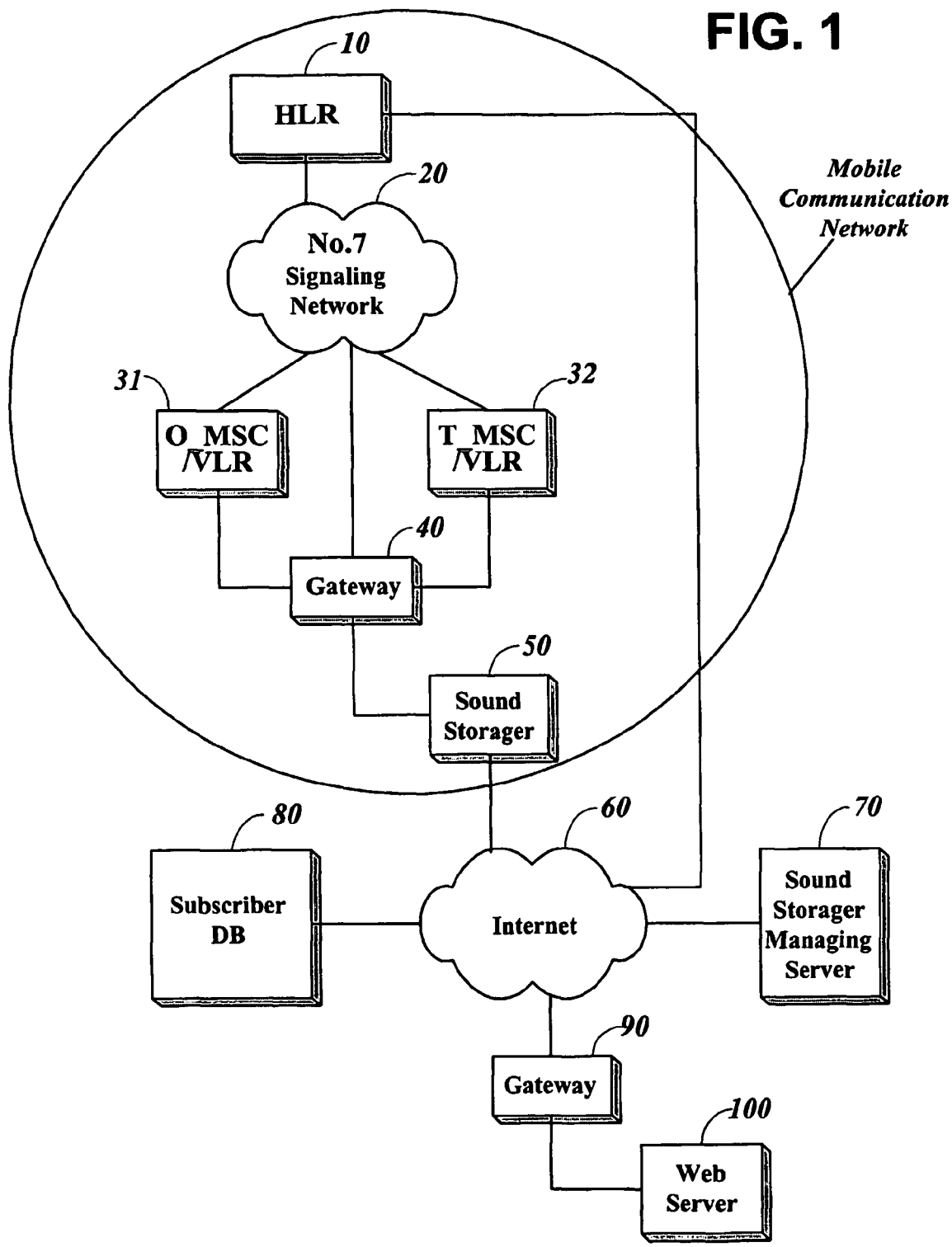

FIG. 1 is a simplified diagram of a mobile communication network which a subscriber-based RBT-replacing sound providing method is embedded in.

The network of FIG. 1 includes an HLR (Home Location Register) 10; mobile exchangers 31 and 32 (also called 'MSC' (Mobile Switching Center)) being capable of communicating with the HLR 10 via a No. 7 signaling network 20 based on No. 7 signaling transfer protocol; a sound storager 50, connected to the No. 7 signaling network 20 via a gateway 40, storing RBT-replacing sounds in connection with their sound codes and communicating with the exchangers 31 and 32; an SSMS (Sound Storager Managing Server) 70, connected to the sound storager 50 via Internet 60, storing identifications, e.g., telephone numbers of subscribers of RBT replacement service in connection with allocated sound codes, and managing to provide RBT-replacing sounds in the sound storager 50; a subscriber db 80 connected to the HLR 10 via Internet 60; and a web server 100, connected to Internet 60 via a gateway 90, communicating with the sound storager 50 and the SSMS 70.

Preferable embodiments of a subscriber-based RBT-replacing sound providing method are explained below in detail along with accompanying operations of the network of FIG. 1.

Figure 2:
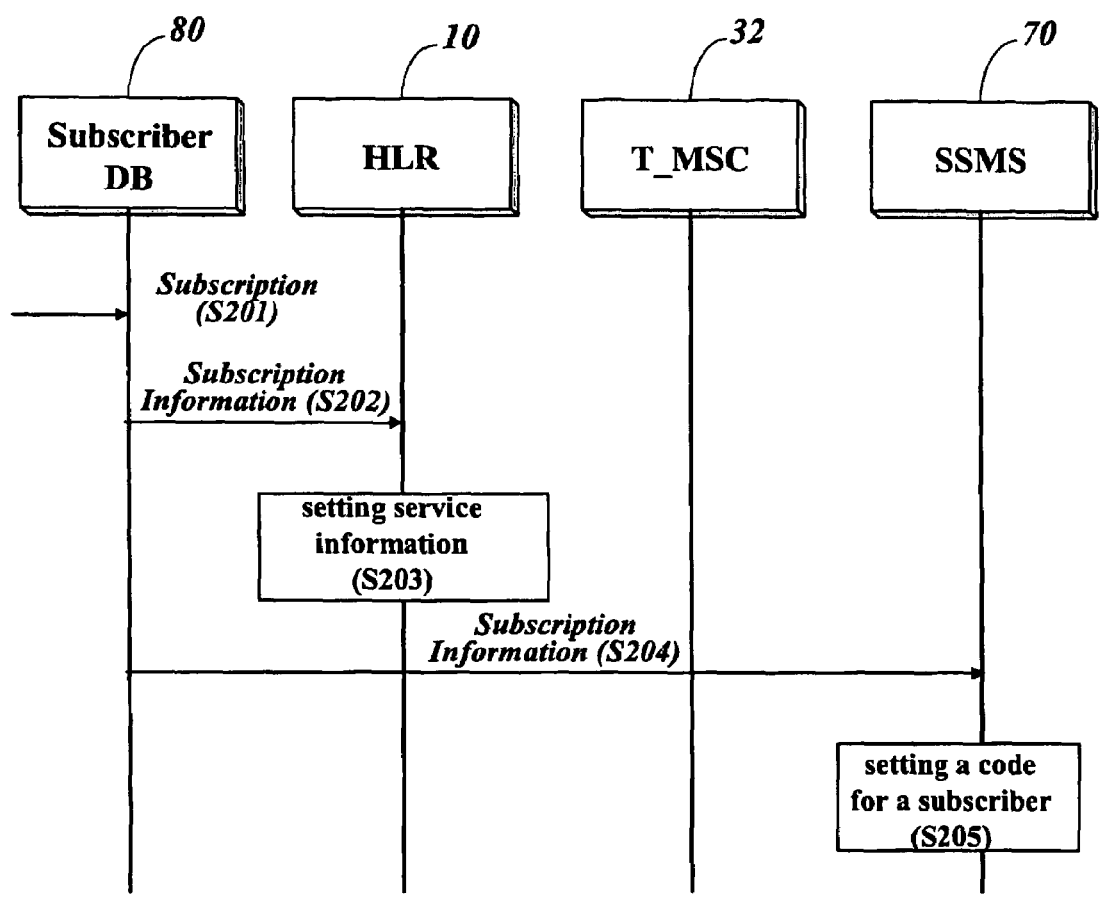
FIG. 2 is a procedure chart to subscribe to a subscriber-based RBT-replacing sound providing service in accordance with the present invention.

FIG. 2 is a procedure chart to subscribe to a subscriber-based RBT-replacing sound providing service in accordance with the present invention.

If subscription to the RBT-replacement service is asked (S201), subscription information including mobile telephone number of the subscriber is stored in the subscriber db 80 first and is then delivered to the HLR 10 (S202). The HLR 10 updates service information of the subscriber profile to indicate that the subscriber has subscribed to RBT replacement service (S203).

In addition, the subscriber db 80 also sends the subscription information including a chosen digital sound and mobile telephone number to the SSMS 70 (S204). The SSMS 70 writes a code associated with the chosen digital sound in an RBT service table allocated for that mobile telephone number (S205). After several subscriptions to RBT replacement service as above, the RBT service table is illustratively constructed as FIG. 7. In the table of FIG. 7, a sound code '07' is initially assigned to a subscriber of '293-XXXX' and another sound code '17' to another subscriber of '294-0000'.

If the received subscription information includes particulars of sound assignments, namely if the received subscription information assigns different digital sounds for each caller, each caller group, and/or each time zone, the SSMS 70 writes different codes of the respective digital sounds in each condition field of the RBT service table, at the step S205.

Figure 3:
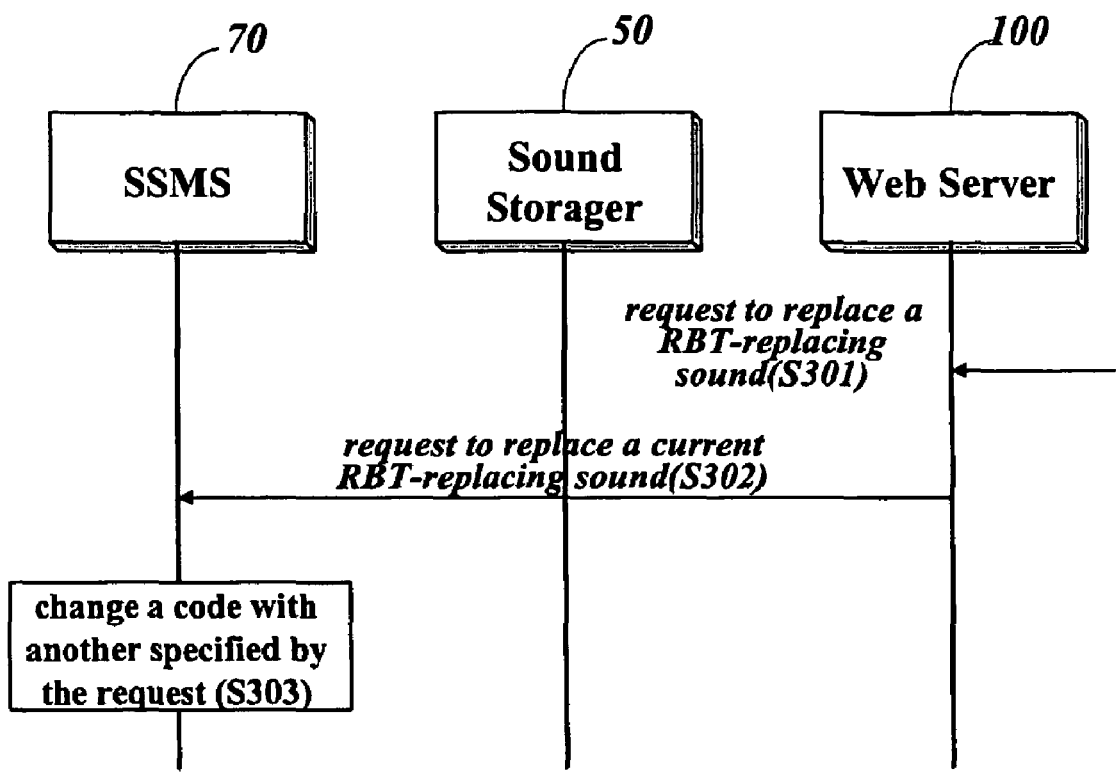
FIG. 3 is a procedure chart to change subscription information related with RBT-replacing sound providing service in accordance with the present invention.

FIG. 3 is a procedure chart to change subscription information related with RBT-replacing sound providing service in accordance with the present invention.

A subscriber, who has subscribed to the RBT replacement service according to the above-explained procedure of FIG. 2, connects his or her personal computer to the web server 100, first. Then, the web server 100 provides web pages on the connected computer screen to enable the subscriber to change information about RBT replacement service.

The subscriber enters mobile telephone number, e.g., '294-0000' through an adequate web page and then selects a desired RBT-replacing sound, e.g., sound#7 from a sound list, which is illustrated in FIG. 8, showing all or a part of sounds #1 to #N with their codes stored in the sound storager 50. If the subscriber requests change of RBT-replacing sound to the chosen one, namely sound#7 (S301), the web server 100 sends a change-requesting message to the SSMS 70 (S302). The SSMS 70 changes the current code '17' with another code '07' assigned to the chosen sound#7 in an RBT service table allocated for the entered subscriber number '294-0000' (S303), as shown in FIG. 7. Afterwards, the RBT-replacing sound 'sound#7' identified by the changed code '07' will be provided instead of a conventional RBT.

Figure 4:
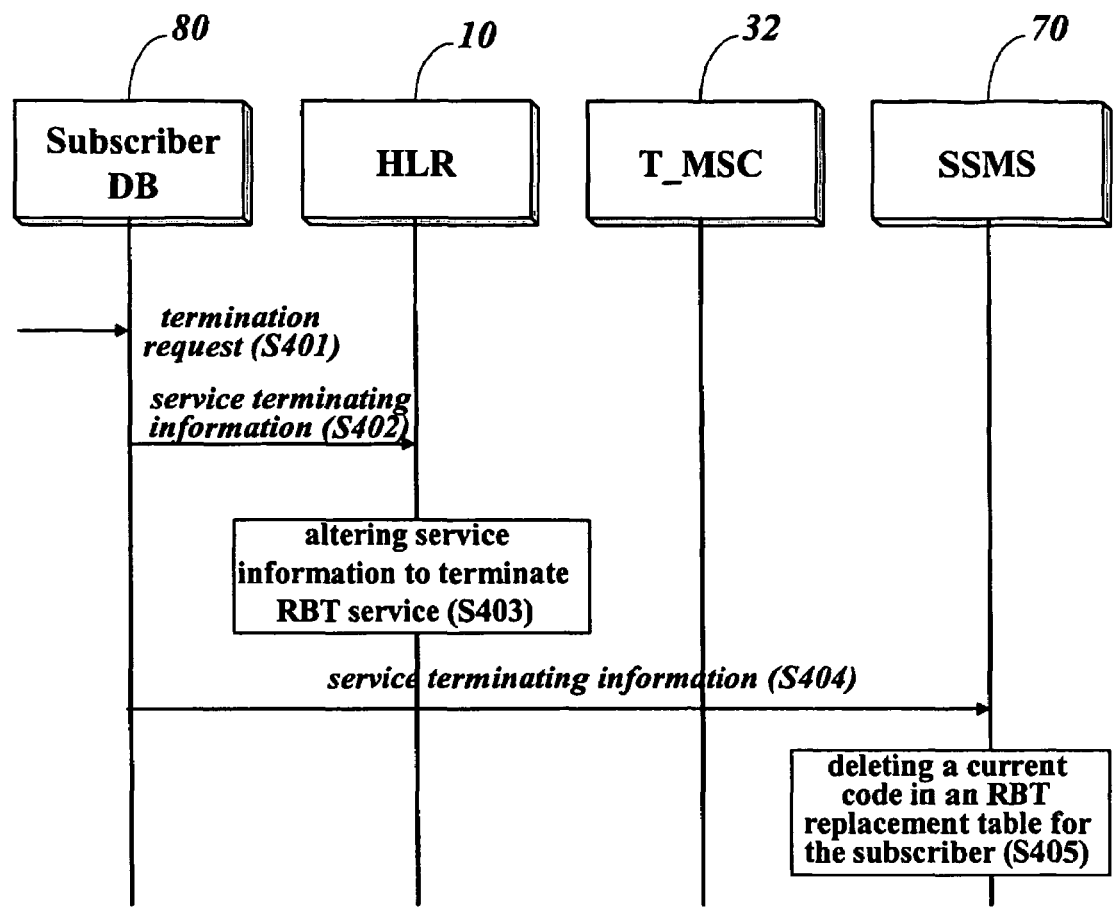
FIG. 4 is a procedure chart to terminate a subscriber-based RBT-replacing sound providing service in accordance with the present invention.

FIG. 4 is a procedure chart to terminate a subscriber-based RBT-replacing sound providing service in accordance with the present invention.

If termination of RBT replacement service is asked from a subscriber (S401), the subscriber db 80 deletes subscription information for RBT replacement service associated with the subscriber, namely, the subscriber's telephone number, and sends service terminating information including a mobile telephone number to the HLR 10 (S402). The HLR 10 alters service information of the subscriber's profile to indicate that the subscriber has not subscribed to RBT replacement service (S403).

The subscriber db 80 also sends the service terminating information to the SSMS 70 (S404), then the SSMS 70 deletes a current code in an RBT service table for the subscriber based on the received service terminating information (S405). For instance, if the subscriber's telephone number included in the service terminating information is '293-XXXX', the SSMS 70 deletes the sound code '07' associated with the number '293-XXXX' in the service table constructed as FIG. 7.

Figure 5:
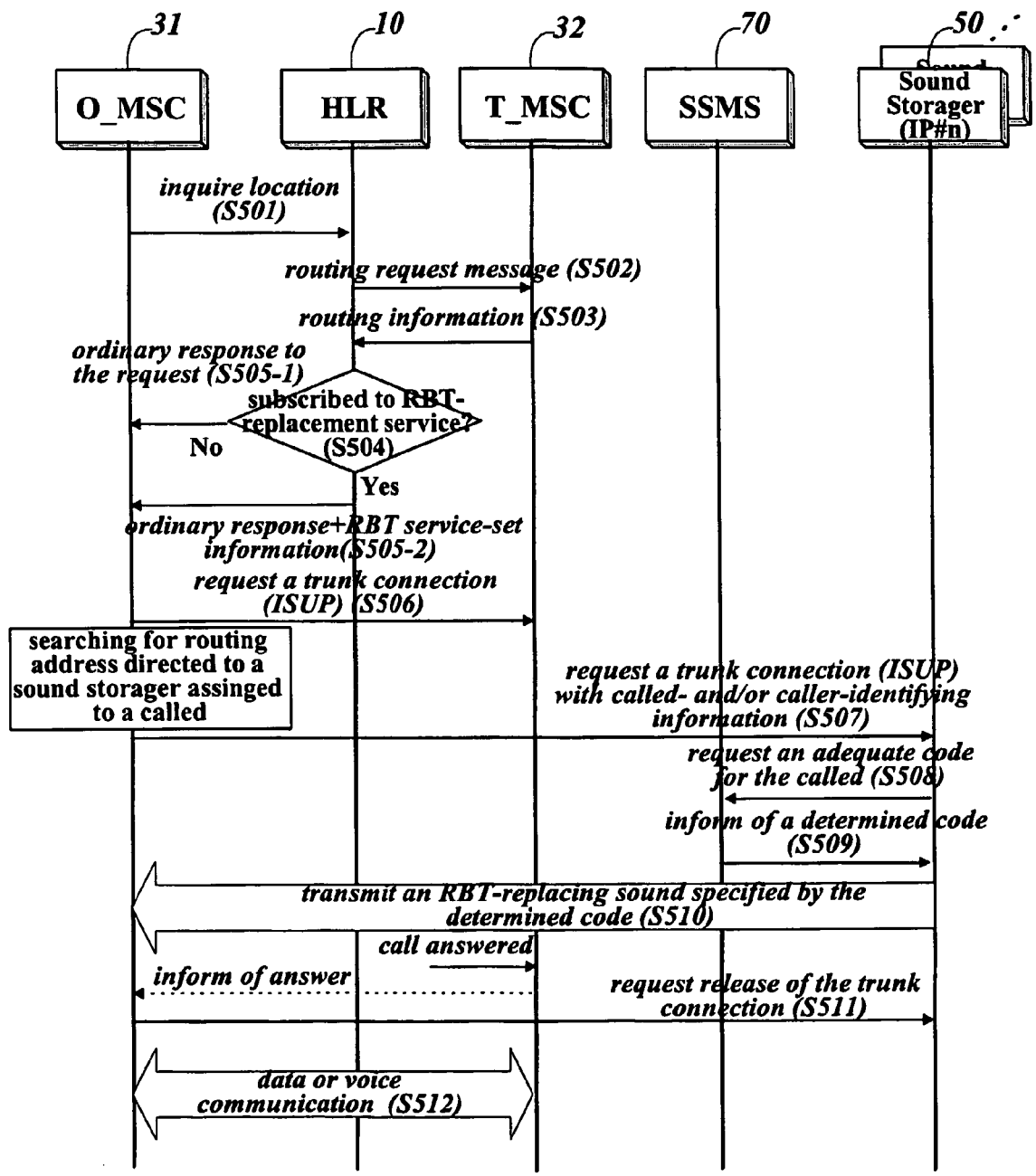
FIG. 5 is a procedure chart of an embodiment to conduct a subscriber-based RBT-replacing sound providing service in accordance with the present invention.

FIG. 5 is a procedure chart of an embodiment to conduct a subscriber-based RBT-replacing sound providing service in accordance with the present invention after completion of the procedure of FIG. 2 and/or FIG. 3.

In this embodiment, an originating exchanger uses system routing data to conduct a subscriber-based RBT-replacing sound providing service.

If an arbitrary subscriber within a service zone of the exchanger 31 calls another subscriber, who has subscribed to the RBT replacement service, within the exchanger 32, the originating exchanger 31 sends a location request message to the HLR 10 to inquire where the called is (S501). Then, the HLR 10 sends a routing request message to the terminating exchanger 32 (S502), and the terminating exchanger 32 informs the HLR 10 of routing information, e.g., TLDN (Temporary Local Directory Number) in response to the routing request message (S503).

The HLR 10 delivers the routing information to the originating exchanger 31 in response to the inquiry step S501. In addition, the HLR 10 checks profile of the subscriber to know whether the called subscriber has been subscribed to the RBT replacement service (S504). If not subscribed, the HLR 10 sends an ordinary response message to the location registration request to the originating exchanger 31 as in the conventional responding procedure (S505-1). The ordinary response message includes TLDN information of the terminating exchanger 32. However, if subscribed, the HLR 10 sends the originating exchanger 31 a response message further including RBT service-set information (S505-2).

The RBT service-set information can be carried by an SRBT (Specific RBT) field, which was defined as a 'reserve' field before, of the value-added service parameters 'CallingFeaturesIndicator2' shown in FIG. 9. The 2-bit SRBT field is set to '10' in case that the RBT replacement service is not activated even though that service is valid by subscription, and it is set to '11' in case that the RBT replacement service is in active state. A message including the parameters 'CallingFeaturesIndicator2' responsive to the location registration request is delivered from the HLR 10 to the originating exchanger 31.

The service information parameters 'CallingFeaturesIndicator2' of FIG. 9 are composed of a VMSB field indicative of state of voice mail service busy; a VMSU field indicative of state of voice mail service busy unconditional; a VMSNA field indicative of state of voice mail service busy no answer; an FMSNA field indicative of state of fax mail service no answer; an FMSB field indicative of state of fax mail service busy; an FMSU field indicative of state of fax mail service unconditional; an MC field indicative of multi-call; a CC field indicative of conference call; an MUDN field indicative of multiple unit directory number; and others.

The originating exchanger 31 requests a trunk connection (called 'ISUP') to only the terminating exchanger 32 (S506) or to both of the exchanger 32 and the sound storager 50 (S506 and S507), based on the information included in the location request response message transmitted from the HLR 10 through conduction of the step S505-1 or S505-2.

That is, the originating exchanger 31 makes a single trunk connection to only the terminating exchanger 32 in case of the step S505-1, and checks the SRBT field in case of the step S505-2. If the SRBT field is '10' the originating exchanger 31 makes a single trunk connection to only the terminating exchanger and, if '11', it makes dual trunk connections to both.

In case of making a trunk connection to a sound storager, the originating exchanger 31 refers to a routing table on its db that maps respective head numbers of called subscribers to sound storagers individually as shown in FIG. 10. That is, the originating exchanger 31 searches the routing table for a head number of the called subscriber and makes a trunk connection to a sound storager addressed by a routing address linked with the found head number.

For instance, if the called number is '293-XXXX', the originating exchanger 31 reads 'IP#n' associated with the head number '293' of the called from the routing table, then, it makes a trunk connection to the sound storager 50 using the routing information 'IP#n'.

Consequently, the originating exchanger 31 makes a single trunk connection to only the terminating exchanger 32 in case of the step S505-1, and checks the SRBT field in case of the step S505-2. If the SRBT field is '10' the originating exchanger 31 makes a single trunk connection to only the terminating exchanger and, if '11', it makes dual trunk connections to both. During communication to setup trunk connection, mobile telephone numbers of the caller and the called are sent to the sound storager 50.

Now, a single trunk connection is made between the originating 31 and the terminating exchanger 32 in the event that only the step S506 is conducted, or respective trunk connections are made between the originating 31 and the terminating exchanger 32 and between the originating exchanger 31 and the sound storager 50 in the event that both steps S506 and S507 are conducted together.

When a trunk connection is made to the originating exchanger 31 according to conduction of the step S507, the sound storager 50 asks an adequate code to the SSMS 70 while providing the received called number, e.g., '293-XXXX' for the SSMS 70 (S508). The SSMS 70 searches the RBT service table structured as FIG. 7 for the called number to determine an assigned code, e.g., '07', and informs the sound storager 50 of the determined code '07' (S509) in response to the code-requesting step S508. The sound storager 50 searches the sound list on its db, structured illustratively as FIG. 8, for the determined code '07' and plays back the sound 'sound#7' associated with the code '07' to the caller through the trunk connection made between the sound storager 50 and the originating exchanger 31 (S510).

If the called answers call paging of the terminating exchanger 32 while the determined sound 'sound#7' is being transmitted instead of a conventional RBT, the originating exchanger 31 that is informed of such an answer by the terminating exchanger 32 requests the sound storager 50 to release the established trunk connection (S511). Then, voice or data are communicated between the caller and the called through the trunk connection between the originating 31 and the terminating exchanger 32 (S512).

Figure 6:
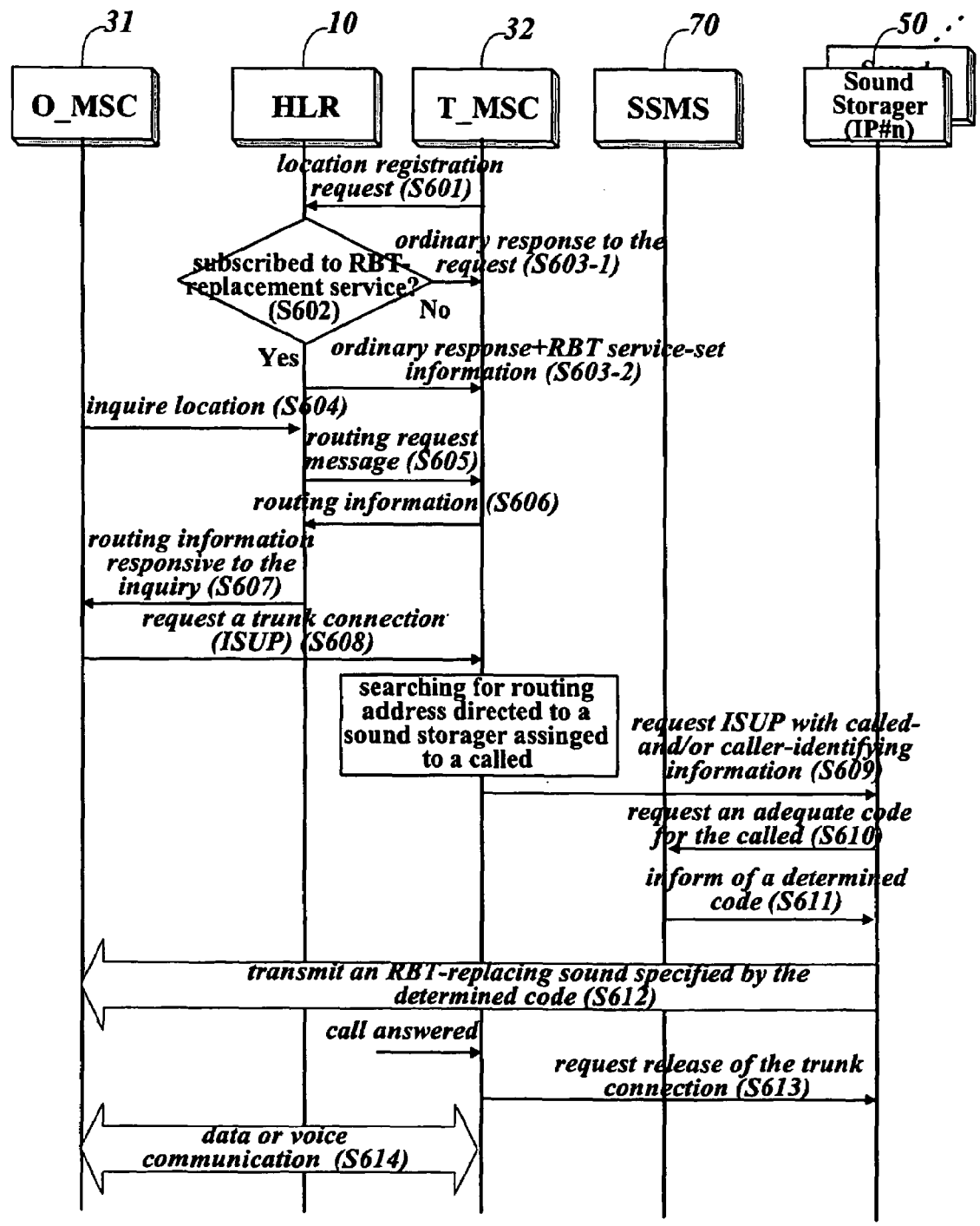
FIG. 6 is a procedure chart of another embodiment to conduct a subscriber-based RBT-replacing sound providing service in accordance with the present invention.

FIG. 6 is a procedure chart of another embodiment to conduct a subscriber-based RBT-replacing sound providing service in accordance with the present invention after completion of the procedure of FIG. 2 and/or FIG. 3.

In this embodiment, a terminating exchanger uses system routing data to conduct a subscriber-based RBT-replacing sound providing service.

When location registration for the subscriber is requested from the exchanger 32 to the HLR 10 (S601), the HLR 10 checks profile of the subscriber to know whether the subscriber has been subscribed to the RBT replacement service (S602). If not subscribed, the HLR 10 sends an ordinary response message to the location registration request 'Registration Notification' to the exchanger 32 as in the conventional request processing procedure (S603-1). However, if subscribed, the HLR 10 sends the exchanger 32 a response message including RBT service-set information. The exchanger 32 registers the received information in the subscriber's profile on a local db, e.g., a VLR (Visitor Location Register) (S603-2).

Afterwards, if an arbitrary subscriber within a service zone of the exchanger 31 calls the location-registered subscriber, who has subscribed to the RBT replacement service, within the exchanger 32, the originating exchanger 31 sends a location request message to the HLR 10 to inquire where the called is (S604). Then, the HLR 10 sends a routing request message to the terminating exchanger 32 (S605), and the terminating exchanger 32 informs the HLR 10 of its routing information, e.g., TLDN (Temporary Local Directory Number) in response to the routing request message (S606).

The HLR 10 delivers the routing information to the originating exchanger 31 in response to the inquiry step S604 (S607). The originating exchanger 31 requests the terminating exchange 32 based on the routing information to make a trunk connection therebetween (S608).

In the meantime, the terminating exchanger 32 checks the 'SRBT' field of the value-added service information of FIG. 9 that was registered for the called in its local db at the step S603-2. If the two bits of the 'SRBT' field are '11' which means 'in-service' and 'activated', the terminating exchanger 32 makes a trunk connection to one sound storager with reference to its own routing table of FIG. 10 that maps respective head numbers of called subscribers to a plurality of sound storagers individually. That is, the terminating exchanger 32 searches the routing table for a head number of the called subscriber and makes a trunk connection to a sound storager addressed by a routing address linked with the found head number.

For instance, if the called number is '293-XXXX', the terminating exchanger 32 reads 'IP#n' associated with the called's head number '293' from the routing table, then, it makes a trunk connection to the sound storager 50 using the routing information 'IP#n'.

While making connection to the sound storager 50, the terminating exchanger 32 furnishes the sound storager 50 mobile telephone numbers of the caller and the called (S609).

Now, respective trunk connections are made between the originating exchanger 31 and the terminating one 32 and between the terminating exchanger 32 and the sound storager 50.

The sound storager 50 asks an adequate code to the SSMS 70 while providing the received number '293-XXXX' for the SSMS 70 (S610). The SSMS 70 searches the RBT service table structured as FIG. 7 for the called number to determine a code, e.g., '07', and informs the sound storager 50 of the determined code '07' (S611) in response to the code-requesting step S610. The sound storager 50 searches the sound list of FIG. 8 for the determined code '07' and transmits the sound 'sound#7' associated with the code '07' to the caller through the trunk connections between the sound storager 50 and the terminating exchanger 32 and between the terminating exchanger 32 and the originating one 31 (S612).

If the called accepts the call from the terminating exchanger 32 while the determined RBT-replacing sound 'sound#7' is being transmitted instead of a conventional RBT, the terminating exchanger 32 requests the sound storager 50 to release the established trunk connection (S613). Then, voice or data are communicated between the caller and the called through the trunk connection between the originating 31 and the terminating exchanger 32 (S614).

Figure 11:
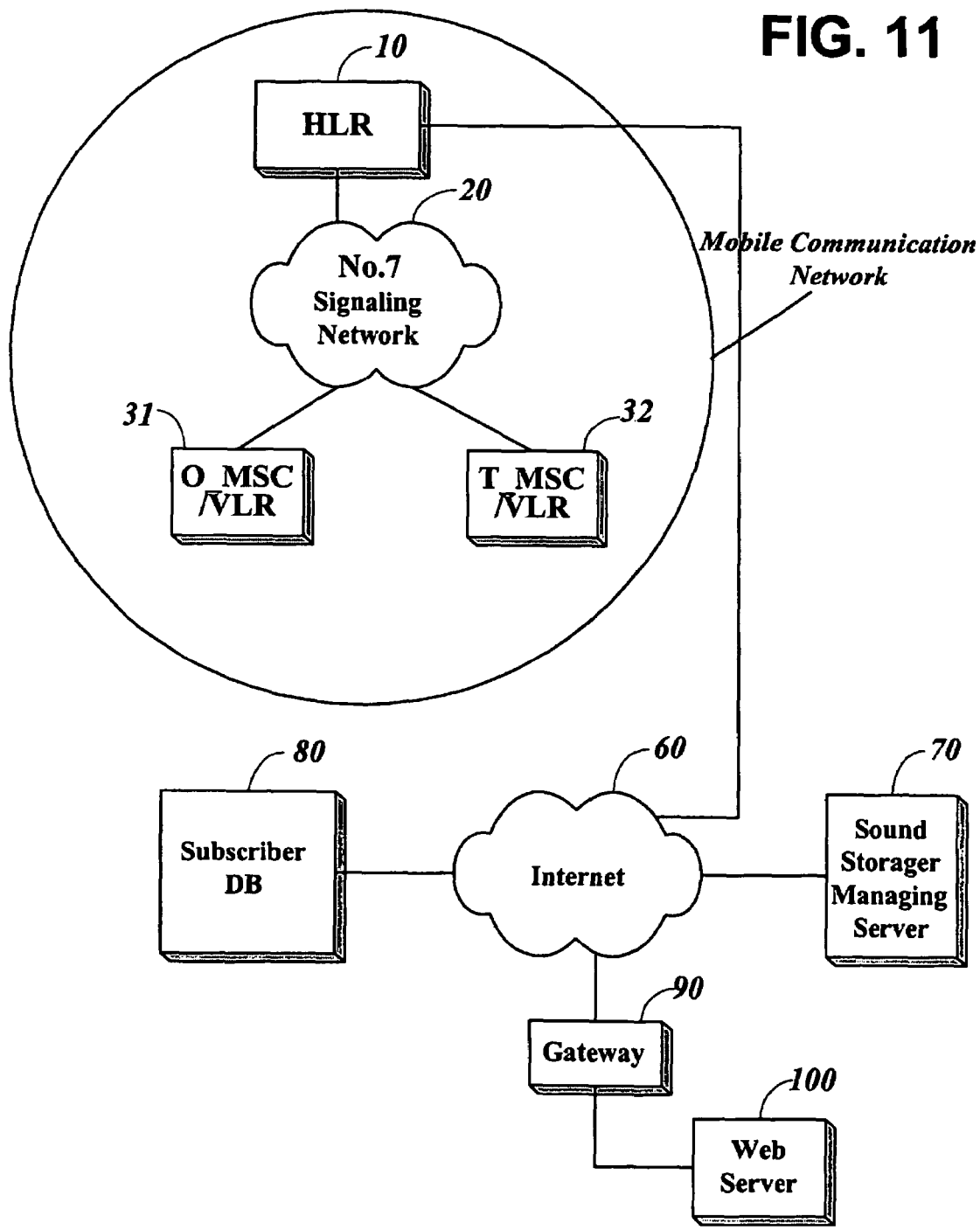

For the above-explained embodiments of FIGS. 5 and 6, it is necessary to equip with the sound storagers. However, if an exchanger stores RBT-replacing sounds for all subscribers the sound storagers need not be included in a mobile communication network. FIG. 11 shows thusly-constructed mobile communication network.

In order to provide RBT replacement service through the network of FIG. 11, the exchangers 31 and 32 store all of RBT-replacing sounds in their dbs individually and have the sound list structured as FIG. 8 that links each RBT-replacing sound to each sound code. Having RBT-replacing sounds, the exchangers 31 and 32 do not have the routing table illustrated in FIG. 10 that is necessary to map respective head numbers of called subscribers to sound storagers.

Figure 12:
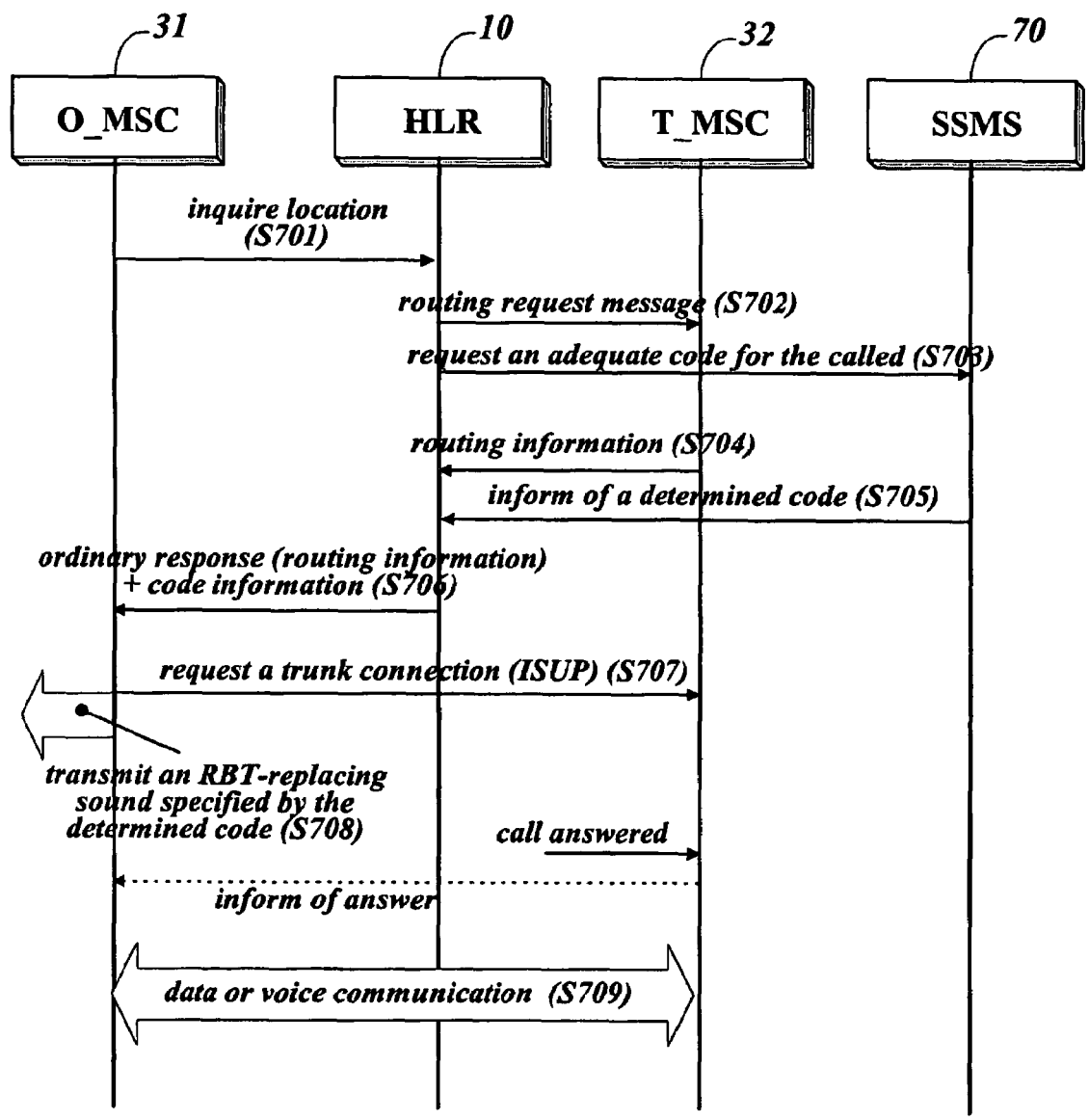
FIG. 12 is a procedure chart of an embodiment to conduct a subscriber-based RBT-replacing sound providing method through the mobile network of FIG. 11 in accordance with the present invention.

FIG. 12 is a procedure chart of an embodiment to conduct a subscriber-based RBT-replacing sound providing service through the network of FIG. 11 in accordance with the present invention after completion of the procedure of FIG. 2 and/or FIG. 3.

In this embodiment, a subscriber-based RBT-replacing sound providing service is conducted under main control of the HLR 10.

If an arbitrary subscriber within a service zone of the exchanger 31 calls another subscriber, e.g., '293-XXXX', who has subscribed to the RBT replacement service, within the exchanger 32, the originating exchanger 31 sends a location request message to the HLR 10 to inquire where the called is (S701). Then, the HLR 10 sends a routing request message to the terminating exchanger 32 (S702), and asks an adequate code for the called number '293-XXXX' to the SSMS 70 at the same time while providing the SSMS 70 with the number (S703).

The terminating exchanger 32 informs the HLR 10 of routing information, e.g., TLDN (Temporary Local Directory Number) directed to itself in response to the routing request step S702 (S704). And, the SSMS 70 searches the RBT service table structured as FIG. 7 for the called number to determine a code, e.g., '07', and informs the HLR 10 of the determined code '07' (S705) in response to the code-requesting step S703.

The HLR 10 delivers the routing information received from the terminating exchanger 32 to the originating exchanger 31 (S706) along with the determined code '07' received at the step S705 from the SSMS 70 in response to the inquiry step S701.

Then, the originating exchanger 31 requests a trunk connection (called 'ISUP') to the terminating exchanger 32 (S707) based on the received routing information, and searches the sound list on its db, structured illustratively as FIG. 8, for the determined code '07' and transmits the sound 'sound#7' associated with the code '07' to the caller as an RBT (S708).

If the called answers the call from the terminating exchanger 32 while the determined sound 'sound#7' is being transmitted instead of a conventional RBT, the originating exchanger 31 that is informed of such an answer by the terminating exchanger 32 stops transmission of the determined sound, and makes voice or data be communicated between the caller and the called through the trunk connection to the terminating exchanger 32 (S709).

FIG. 13 is a procedure chart of another embodiment to conduct a subscriber-based RBT-replacing sound providing service through the network of FIG. 11 in accordance with the present invention after completion of the procedure of FIG. 2 and/or FIG. 3.

In this embodiment, a subscriber-based RBT-replacing sound providing service is also conducted under main control of the HLR 10 the same as the embodiment of FIG. 12.

If an arbitrary subscriber within a service zone of the exchanger 31 calls another subscriber, e.g., '293-XXXX', who has subscribed to the RBT replacement service, within the exchanger 32, the originating exchanger 31 sends a location request message to the HLR 10 to inquire where the called is (S801).

The HLR 10 asks an adequate code for the called number '293-XXXX' to the SSMS 70 while providing the SSMS 70 with the number (S802), and the SSMS 70 searches the RBT service table structured as FIG. 7 for the called number to determine a code, e.g., '07', and informs the HLR 10 of the determined code '07' (S803) in response to the code-requesting step S802.

Then, the HLR 10 sends a routing request message to the terminating exchanger 32. Especially, the determined code '07' is carried by the routing request message (S804).

The terminating exchanger 32 informs the HLR 10 of routing information, e.g., TLDN directed to itself in response to the routing request step S804 (S805).

The HLR 10 delivers the routing information received at the step S805 from the terminating exchanger 32 to the originating exchanger 31 in response to the inquiry step S801 (S806).

Then, the originating exchanger 31 requests a trunk connection (called 'ISUP') to the terminating exchanger 32 (S807) based on the received routing information. Responding to the trunk connection request, the terminating exchanger 32 searches the sound list on its db, structured illustratively as FIG. 8, for the code '07', that was received through the routing information request message from the HLR 10 at the step S804, and transmits the sound 'sound#7' associated with the code '07' to the caller as an RBT (S808).

If the called answers the call from the terminating exchanger 32 while the determined sound 'sound#7' is being transmitted instead of a conventional RBT, the terminating exchanger 32 stops transmission of the determined sound, and makes voice or data be communicated between the caller and the called through the trunk connection to the originating exchanger 31 (S809).

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method of providing an arbitrary sound as an RBT (RingBack Tone) in a communication network, comprising: a first step, conducted by an HLR (Home Location Register), of furnishing a call-originating exchanger with information on whether or not an RBT is to be replaced for a terminal through a response to a location request message received from the call-originating exchanger that sends the location request message to the HLR when a call connection is requested to the terminal; a second step, conducted by the call-originating exchanger, of requesting a trunk connection to a call- terminating exchanger based on the response, and further requesting another trunk connection to a sound providing means based on the information with reference to preset routing information to the sound providing means while furnishing the sound providing means with information to identify the terminal; and a third step, conducted by the sound providing means, of selecting an RBT-replacing sound based on the terminal identifying information, and providing the selected RBT-replacing sound for a caller through the call-originating exchanger the trunk connection is made to.

2. The method of claim 1, wherein the routing information specifies a routing address of a sound providing means allocated to a terminal.

3. The method of claim 2, wherein the routing information allocates respective head numbers of subscribers to routing addresses of a plurality of sound providing means.

4. A method of providing an arbitrary sound as an RBT (RingBack Tone) in a communication network, comprising: a first step, conducted by an HLR (Home Location Register), of furnishing an exchanger with information on whether or not an RBT is to be replaced for a terminal when location of the terminal is registered through the exchanger; a second step, conducted by the exchanger when a call to the terminal is recognized, of requesting a trunk connection to a sound providing means based on the information with reference to preset routing information to the sound providing means while furnishing the sound providing means with information to identify the terminal; and a third step, conducted by the sound providing means, of selecting an RBT-replacing sound based on the terminal identifying information, and providing the selected RBT-replacing sound for a caller through the exchanger the trunk connection is made to.

5. The method of claim 4, wherein the routing information specifies a routing address of a sound providing means allocated to a terminal.

6. A method of providing an arbitrary sound as an RBT (RingBack Tone) in a communication network, comprising: a first step, conducted by an HLR (Home Location Register), of searching for a sound code assigned to a terminal, if a location request message is received from a call-originating exchanger when a call connection is requested to the terminal, and sending the call-originating exchanger the found sound code through a response message to the location request message; and a second step, conducted by the call-originating exchanger, of requesting a trunk connection to a call- terminating exchanger based on the response message, and providing a caller with an RBT-replacing sound associated with the found sound code.

7. The method of claim 6, wherein a server separated from the HLR has a subscriber-code table where subscriber numbers are associated with sound codes individually, and the HLR searches for the sound code with the aid of the server.

8. The method of claim 7, wherein the HLR communicates with the server based on internet protocol in the code searching operation.

9. A method of providing an arbitrary sound as an RBT (RingBack Tone) in a communication network, comprising: a first step, conducted by an HLR (Home Location Register), of searching for a sound code assigned to a terminal, if a location request message is received from a call-originating exchanger when a call connection is requested to the terminal, and sending a routing information request message including the found sound code to a call-terminating exchanger; a second step, conducted by the HLR, of sending the call-originating exchanger routing information received, in response to the routing information request message, from the call-terminating exchanger; and a third step, conducted by the call-terminating exchanger, of transmitting an RBT-replacing sound associated with the found code to a caller through a trunk connection when the call-originating exchanger makes the trunk connection to the call-terminating exchanger based on the routing information.

10. The method of claim 9, wherein a server separated from the HLR has a subscriber-code table where subscriber numbers are associated with sound codes individually, and the HLR searches for the sound code with the aid of the server.

* * * * *